US006345833B2

(12) United States Patent
Melgarejo et al.

(10) Patent No.: US 6,345,833 B2
(45) Date of Patent: *Feb. 12, 2002

(54) TWO-PIECE SIDE FRAME ASSEMBLY FOR SMALL WHEELCHAIRS

(75) Inventors: Mauricio Melgarejo; Alejandro Melgarejo, both of Simi Valley, CA (US)

(73) Assignee: Freedom Designs Incorporated, Simi Valley, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/191,422

(22) Filed: Nov. 12, 1998

(51) Int. Cl.[7] .................................................. B62M 1/14

(52) U.S. Cl. ................................ 280/250.1; 280/304.1; 280/287; 280/755; 297/DIG. 4

(58) Field of Search ........................... 280/281.1, 304.1, 280/250.1, 287, 638, 755; 297/DIG. 4, 638, 657

(56) References Cited

U.S. PATENT DOCUMENTS 4,721,321 A * 1/1988 Haury et al. ....... 297/DIG. 4 X
5,253,888 A * 10/1993 Friedrich ................. 280/250.1
5,267,745 A * 12/1993 Robertson et al. ....... 280/250.1
5,516,226 A * 5/1996 Wu ..................... 280/250.1 X
5,560,627 A 10/1996 Zatulovsky et al.
5,593,173 A * 1/1997 Williamson .......... 280/250.1 X
5,727,802 A * 3/1998 Garven, Jr. et al. ... 280/304.1 X
5,743,545 A * 4/1998 Kunze et al. ............ 280/250.1
5,762,356 A * 6/1998 Kunze et al. ............ 280/340.1

* cited by examiner

*Primary Examiner*—J. J. Swann
*Assistant Examiner*—F. Zeender
(74) *Attorney, Agent, or Firm*—Oppenheimer Wolff & Donnelly LLP; Marc P. Bobys

(57) ABSTRACT

A sideframe for a wheelchair has a top frame and a separate bottom frame. An axle plate extends between and is attached to both the top and bottom frames. A caster plate is attached to the sideframe. The top frame and the bottom frame are removably attached to one another. In particular embodiments of the invention, the top and bottom frames each comprise a plurality of bolt apertures. The axle plate and the axle extension plate may each comprise a plurality of bolt apertures. The sideframe may support a rear-mounted major wheel, with the axle plate being to the rear of the sideframe and the caster plate being in the front of the sideframe. Alternatively, the sideframe may support a front-mounted major wheel, with the axle plate being to the front of the sideframe and the caster plate being to the rear. To mount the top frame to the bottom frame, the top frame may have a downwardly extending portion with a concave end piece extending therefrom. The concave end piece is adapted to engage with the bottom frame, which may be a tubular member. Two sideframes may be interconnected to form a wheelchair frames. Left and right sideframes are removably connected to one another by at least one connecting member extending in between and connected to the first and second sideframes, respectively. The structure of the presently-preferred embodiment of the sideframe permits the construction of very short sideframes for use in wheelchairs for small children.

7 Claims, 5 Drawing Sheets

TWO-PIECE SIDE FRAME ASSEMBLY FOR SMALL WHEELCHAIRS

I. BACKGROUND OF THE INVENTION a. Field of the Invention

The present invention relates to wheelchairs and, in particular, to a side frame assembly constructed of sub-upper and lower portions that are connected together without the use of welding.

b. Prior Art

Designing wheelchairs that are both adaptable and easy to manufacture has been particularly challenging. The typical wheelchair frame has a side frame with an upper member, a lower member, and one or more vertical members welded into place on the lower and/or upper side frame members. FIG. 1 illustrates a portion of a prior art welded frame 5 in which vertical support members 6 and 7 are welded into place. Although the vertical, welded members are typically necessary in order to provide vertical strength to the wheelchair frame, the welding process is time consuming and expensive. Furthermore, once a piece is welded into place on the side frame, it is impossible to move the location of the welded piece. Consequently, welded wheelchair side frames are both slow to manufacture and not versatile once the wheelchair has been constructed.

Welded frames have been used to manufacture small wheelchairs for children. The seat of the wheelchair is preferably low to the ground, so that a child can easily climb into the chair. To reduce the height of the chair, it is desirable to reduce the height of the sideframes. One approach to making relatively short sideframes has been to weld vertical support members between horizontal sideframe members, as FIG. 1 illustrates. These welded sideframes suffer from the same problems described above, namely, they are time consuming to manufacture and have a fixed, non-adaptable configuration.

An alternative type of sideframe is a one-piece, non-welded sideframe having an upper portion, a lower portion and at least one side portion. There are bends in the sideframe at the juncture of the upper portion with the side portion, and at the juncture of the side portion and the lower portion. The bend is typically a portion of a circle. Sideframes having a height as measured from the bottom of the lower portion to the top of the upper portion of approximately nine (9) inches have been achieved with this design. However, it is very difficult, if not impossible, to manufacture a one-piece, non-welded design of this sort that is short enough for a small child's wheelchair, in which the sideframe can be as short as six (6) inches or less. The radius of curvature of the bends that join the upper, side and lower portions would need to be prohibitively tight for standard tubular sideframe members.

There is, therefore, a need in the art for a wheelchair side frame design that is easier to construct and more versatile than known wheelchair designs utilizing welds. Furthermore, there is a need for a non-welded sideframe construction that can be used to construct small sideframes for use in children's' wheelchairs.

II. SUMMARY OF THE INVENTION

In light of the problems inherent with welded sideframes, the present invention presents an improved and more adaptable sideframe design than is known in the art. The present invention includes a wheelchair side frame having an upper member and a lower member separate from the upper member. The upper member is removably interconnected with the lower member, and the sideframe is generally free of welds. This two-piece, nonwelded configuration is especially useful in designing short wheelchairs for children, although it also can be used for larger wheelchairs.

In accordance with one particular embodiment of the present invention, a sideframe for a wheelchair has a top frame and a separate bottom frame. An axle plate extends between and is attached to the top and bottom frames, thereby interconnecting the top and bottom frames. A caster plate is attached to the sideframe, and the top frame and the bottom frame are removably attached to one another.

The sideframe may have a variety of additional features. The top and bottom frames may each comprise a plurality of bolt apertures. Similarly, the axle plate and the axle extension plate each comprise a plurality of bolt apertures. In an arrangement for support a rear-mounted major wheel, the axle plate is to the rear of the sideframe and the caster plate is to the front of the sideframe. In an alternative arrangement for supporting a front-mounted major wheel, an axle plate is to the front of the sideframe and the caster plate is to the rear of the sideframe.

In accordance with further alternative features, the top frame may comprise an upper portion and a downwardly extending rear portion. The downwardly-extending rear portion may be removably attached to the lower frame member. The downwardly extending portion may include a concave end piece adapted for engagement with the lower frame member, which may have a variety of different cross-sections, including tubular. In either arrangement, the caster plate may be attached to the bottom member and to the top member to interconnect the bottom member with the upper member In accordance with another aspect of the present invention, a wheelchair frame comprises left and right sideframes. The sideframes are removably connected to one another by at least one connecting member extending in between and connected to the first and second sideframes, respectively. The connecting member may include one or more concave end pieces adapted to interconnect with the top and bottom members. The concave end pieces may each have a bolt receptor. The frame may include an anti-tip member extending rearwardly or forwardly therefrom. The anti-tip member may include one or more wheels such that the anti-tip member rolls along the ground with the major wheel.

The proceeding generally summarizes major points of the invention. However, additional points and objects of the invention may be gleaned from the Detailed Description of the preferred embodiments, from the drawings, and from the claims. Consequently, this Summary is not to be viewed as limiting the scope of the invention.

III. BRIEF DESCRIPTION OF THE DRAWINGS

IV. DETAILED DESCRIPTION OF THE PREFERRED EMBODIMENT

Figure 2:
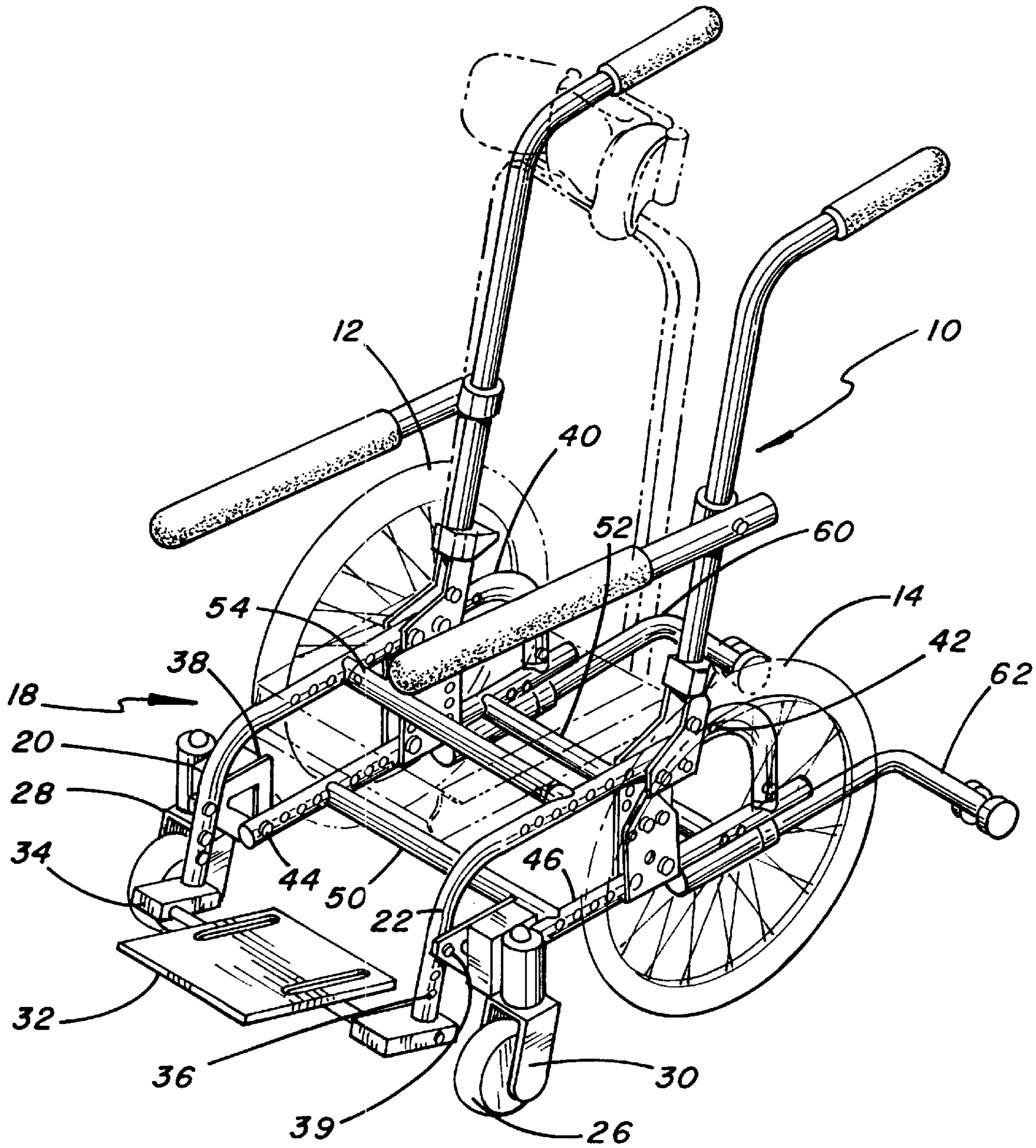
FIG. 2 is a perspective view of a wheelchair frame in accordance with the present invention.
Figure 5:
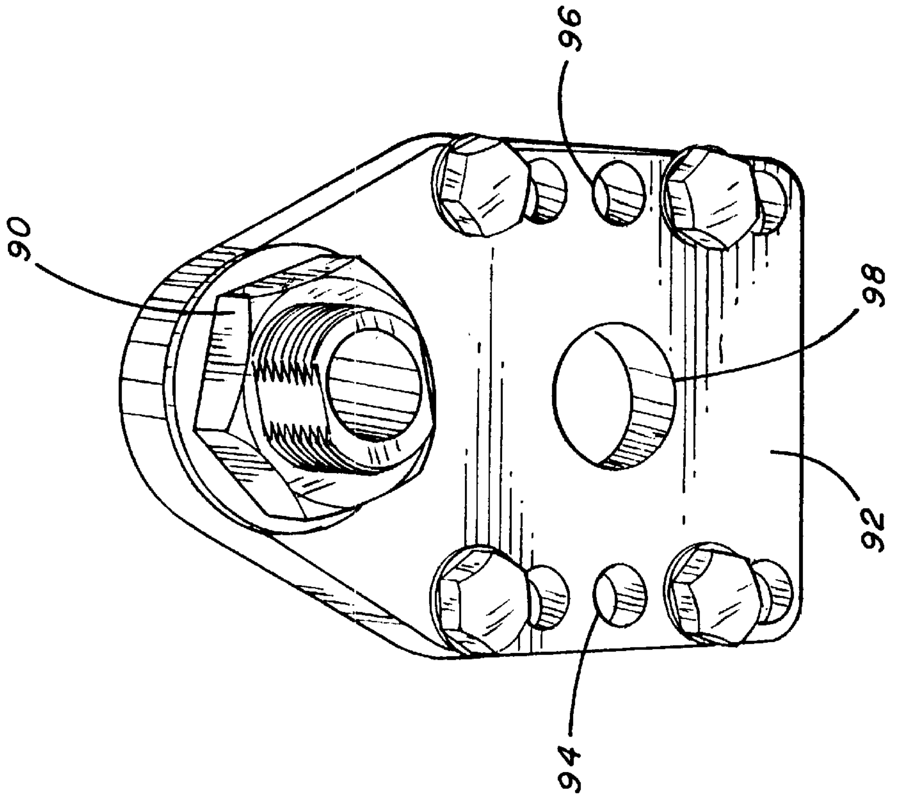
FIG. 5 illustrates an axle extension plate as used in a presently preferred embodiment of the invention.

Referring to FIG. 2, a wheelchair 10 has left and right wheels 12 and 14 and a seat 16. A lower frame 18 includes a left side frame 20 and a right side frame 22. Small forward wheels 24 and 26 extend from casters 28 and 30 respectively. A single piece footrest 32 extends between the left and right footrest hangers 34 and 36, respectively.

Each of the side frames 20 and 22 have respective upper frame members 40 and 42, respectively, and lower sideframe members 44 and 46, respectively. The lower frame members 44, 46 are spaced by spacer members 50 and 52, respectively. The upper frame members 40 and 42 are spaced and interconnected by spacer bar 54.

The wheelchair is stabilized by anti-tip members 60 and 62, respectively, each of which is generally a rearwardly extending member having stabilization wheels. These anti-tip members 60 and 62 prevent the wheelchair from tipping backwards during use.

The respective upper and lower sideframe members are interconnected without the use of welds. Considering the left sideframe, and referring to FIG. 3, the upper frame portion 40 and the lower frame portion 44 are interconnected at a juncture point 46. The upper member 40 in the preferred embodiment is a tubular member that is hollow inside. Tubular members for wheelchair frames are well-known in the art, although a presently preferred embodiment of the invention incorporates tubular members having a diameter of 1" and a wall thickness of 1⁄16".

Figure 7:
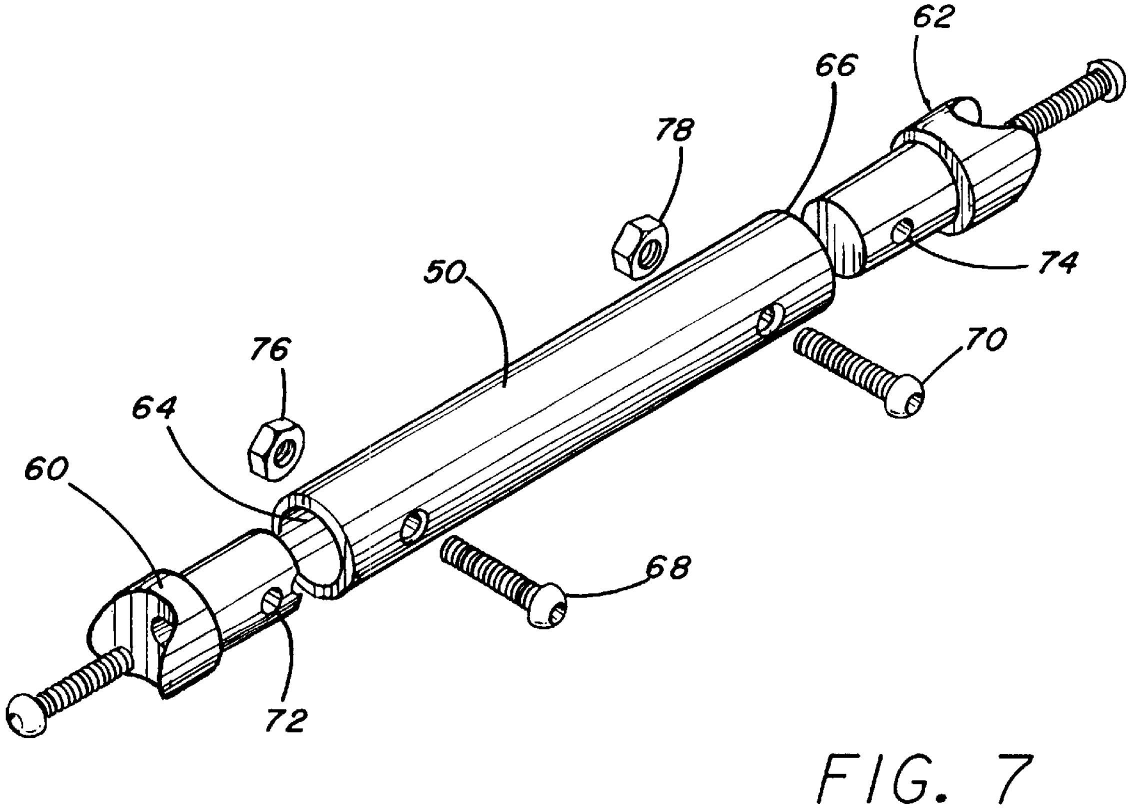
FIG. 7 is an exploded view of a connector member and associated end pieces for joining the left and right sideframe portions.
Figure 8:
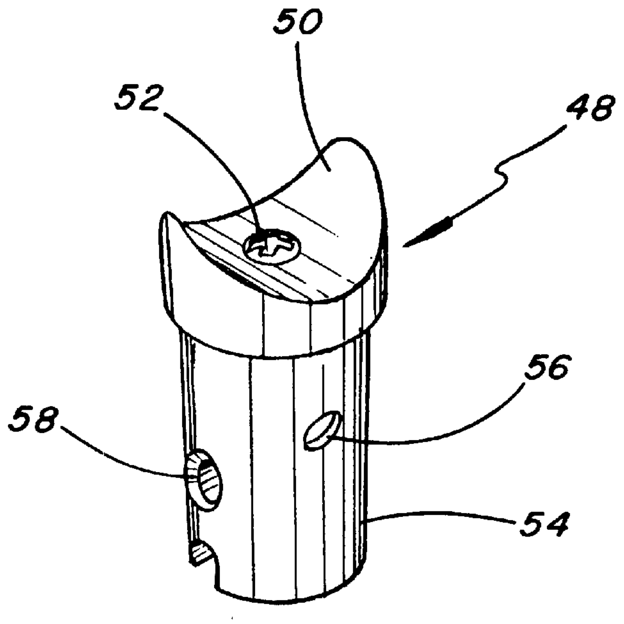
FIG. 8 is a detail view of an end piece.

Extending from the end of member 40 at juncture point 46 is an end piece 48. The end piece 48 is shown in detail in FIG. 8. The end piece 48 has a convex surface 50 having a threaded bolt receptor 52. The member 48 also has a neck portion 54 that is sized so as to fit within the tubing that forms a member of the side frame. A bolt aperture 56 extends through the neck portion 54 such that a bolt may be inserted through aperture 56 to secure the member 48 within the tube within which the member is to reside. An optional indentation 58 may be provided to accommodate a spring-loaded pin type of retaining system. FIG. 7 illustrates how end pieces 160 and 162 are inserted into respective ends 64 and 66 of member 50. Respective bolts 68 and 70 are inserted through opening in the tube 50 through the apertures 72 and 74, respectively, in the members 160 and 162, and then through bottom openings in the tube 50. Nuts 76 and 78 secure the bolts 68 and 70 into place.

Returning to FIG. 3, a bolt 80 is inserted through the tubular member 44 and into the end piece 46 in order to interconnect member 44 with upper member 40. However, the end piece 46 and bolt 80 combination is only one means for securing the members 40 and 44 together. The upper and lower members are also secured together by way of an axle plate 82, which extends between and is bolted to both members 44 and 40.

Figure 4:
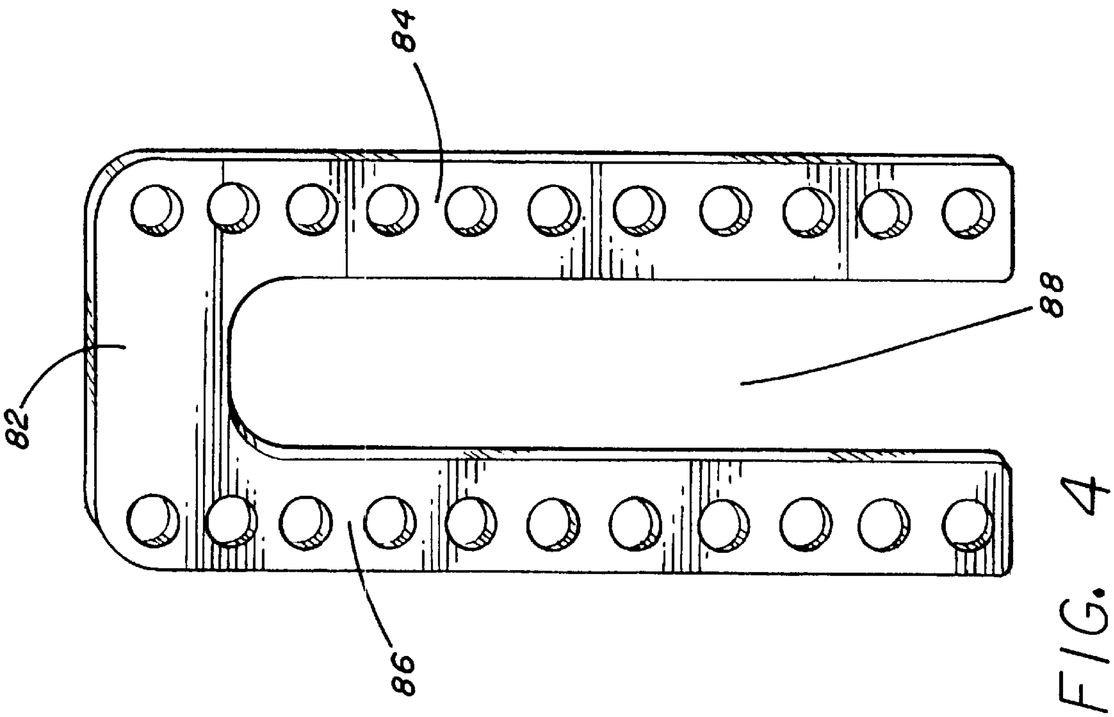
FIG. 4 illustrates an axle plate as used in a presently preferred embodiment of the invention.

Referring to FIG. 4, the axle plate 82 has a plurality of holes along each longitudinal side 84 and 86. This plurality of holes 84 and 86 provides the user with flexibility as to where the plate will be attached to the respective frame members 40 and 44. For example, if the spacing between members 40 and 44 in a particular embodiment is especially short, the user may use the same plate 82 to join the two members together. The user simply reduces the spacing between the holes along the plurality of holes 84 and 86 and inserts bolts to hold the plate onto the frame members. In this way, the present system for interconnecting the members 40 and 44 is particularly versatile. Compared to systems in which members are welded, the use of the members such as 82 greatly simplifies the manufacturing process. To modify the way in which members 44 and 40 are joined together, the user simply unbolts member 82, and then is free to move member 82 forward or backward as the situation requires. This flexibility is simply impossible in frames that are welded.

Figure 1:
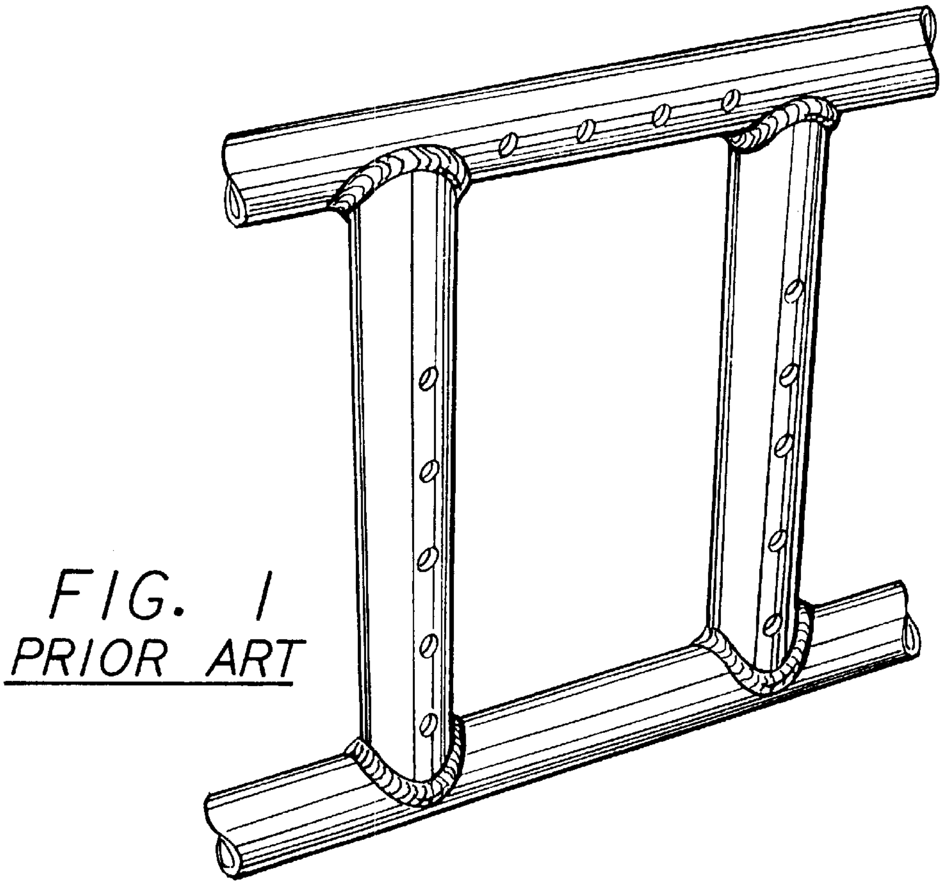
FIG. 1 PRIOR ART
FIG. 1 is a section of a prior art welded sideframe.
Figure 3:
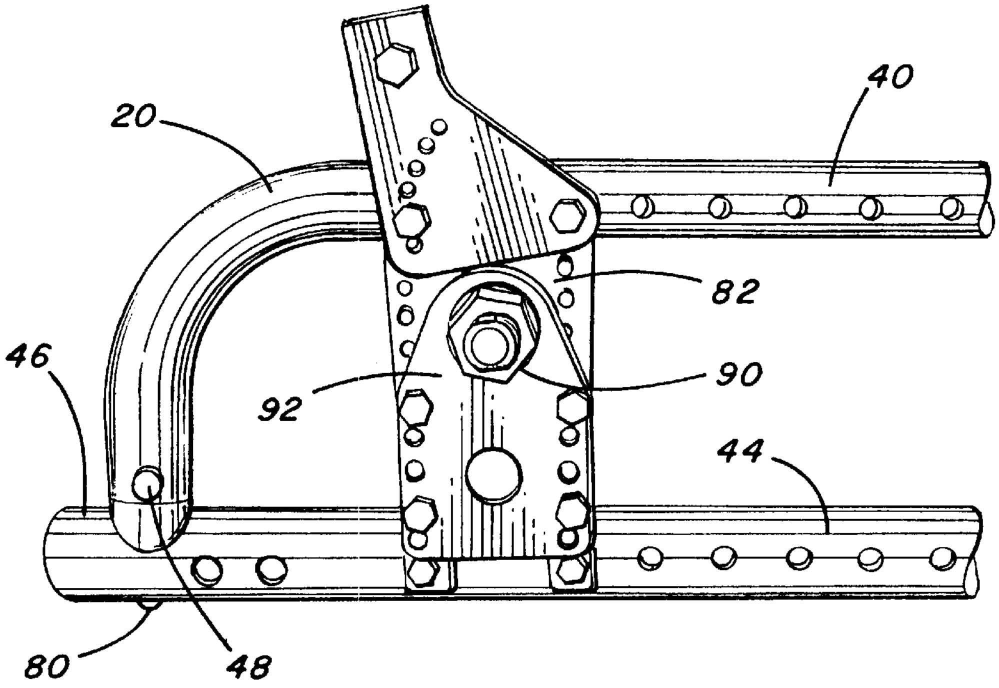
FIG. 3 illustrates the interface between the upper and the lower portions of the sideframe.

Considering member 82 further, an elongated opening 88 is provided through the center of member 82. The opening 88 is wide enough to accommodate an axle sheath receptor into which an axle may be inserted. The axle sheet receptor, as seen in FIG. 3, has reference numeral 90 and serves to accommodate the axle of the wheel 12 (not shown). An axle extension plate 92 is bolted onto axle extension plate 82 to provide means for retaining a wheel axle. The plate 92 includes sets of holes 94 and 96 and an alternative axle opening 98 which can be used to accommodate a wheel axle in some embodiments of the invention. Like the axle plate 82, the axle extension plate 92 is designed to provide the user with considerable flexibility and adaptability. The plurality of holes 94 and 96 permit the user to vary the way in which the axle extension plate 92 is mounted onto the axle plate 82. In most embodiments, the axle extension plate 92 is secured onto axle plate 82 with four simple bolts. However, with the plurality of holes 94 and 96, the user can secure the axle extension plate 92 onto the axle plate 82 using more than four bolts, or potentially fewer bolts.

The axle extension plate 92 serves to provide an axle sheath receptor 90 for receiving and retaining a wheel axle. In an alternative embodiment, the axle plate 82 may itself be provided with the axle sheath receptor 90 so as to unify the functions of plates 82 and 92. However, in the presently preferred embodiment, a separate axle plate and an axle extension plate are employed.

Figure 6:
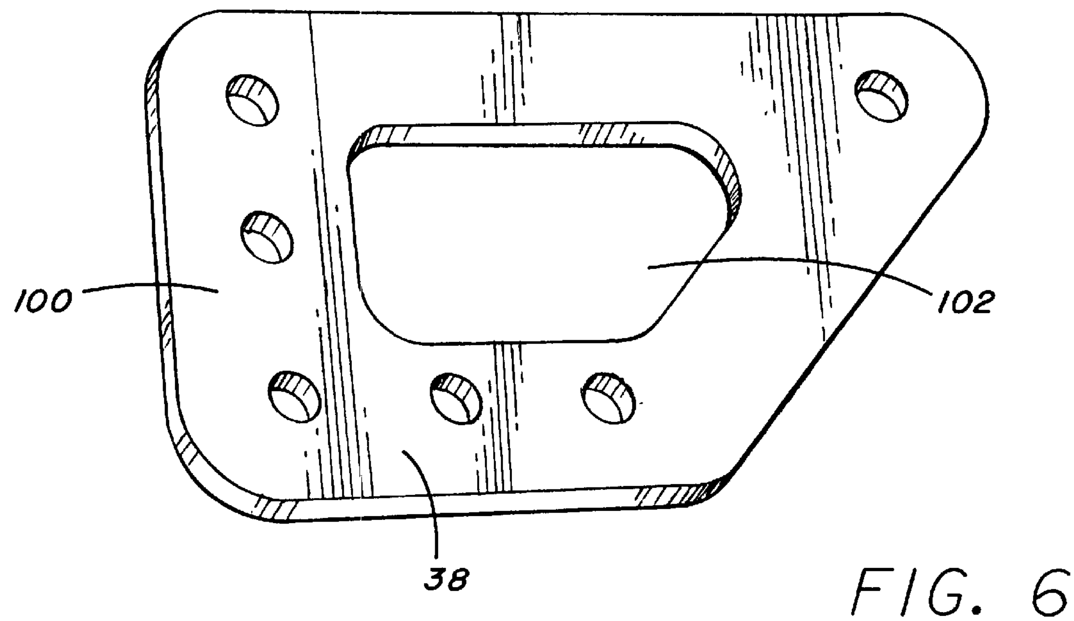
FIG. 6 illustrates a presently preferred castor plate.

Returning now to FIG. 2, an additional means for securing the respective lower side frame members 44 and 46 to the respective upper side frame members 40 and 42 are caster plates 38 and 39, respectively. Turning to FIG. 6, a caster plate 38 includes a plurality of bolt holes 100 about the perimeter thereof. As with the axle plate 82 and the axle extension plate 92, the apertures in caster plate 38 provide the user with considerable flexibility in manufacture. One caster plate 38 may be used in any of variety in wheelchair designs because the plurality of bolt apertures 100 provide the manufacturer with a variety of connection points from which to choose. The caster plate 38 is provided with a central opening 102 through which the respective caster 28 may be mounted.

By way of illustrative dimensions, and not by limitation, the following components in one small wheelchair embodiment of the invention may have the following particular dimensions. It should be noted, however, that the present invention is not limited to any one embodiment. The wheels are approximately 16 inches in diameter. The lower sideframe members are approximately 17 inches long. The space between the left and right sideframes is approximately 10¼ inches. The space between the upper and lower side frame members is approximately 5 inches, as measured from the center of the upper tube to the center of the bottom tube, or 6 inches as measured from the bottom of the bottom tube to the top of the upper tube. The upper and lower sideframe members are hollow metal tubes having a diameter of approximately one inch. The axle plate is approximately 6¾ inches long by 2½ inches wide.

It is generally noted that the above dimensions pertain to a presently preferred embodiment of the invention. The structure of the sideframe design presented herein permits the very short spacing between the upper and lower sideframe members described above. The six-inch top-to-bottom sideframe spacing of the presently preferred embodiment is considered to be a noteworthy achievement in the art, particularly with the presently preferred adaptable, non-welded sideframe.

The foregoing has described one presently preferred embodiment of the present invention. However, it is to be understood that the present invention is not limited to any one embodiment. Consequently, various improvements and changes may be made. For example, the embodiment illustrated in FIG. 2 has the major wheels 12 and 14 mounted to the rear of the wheel chair and the minor caster wheels 24 and 26 mounted at the front of the wheelchair. However, in some embodiments, and especially in embodiments for small children, it is desirable to mount the major wheels 12 and 14 on the front of the wheelchair, and to move the smaller caster wheel 24 and 26 to the rear of the wheelchair. In such an embodiment, the anti tip members 60 and 62 will be mounted in the front, rather than the back of the wheelchair, such that the members 60 and 62 extend forwardly with the wheels thereof being in front of the wheelchair.

Figure 9:
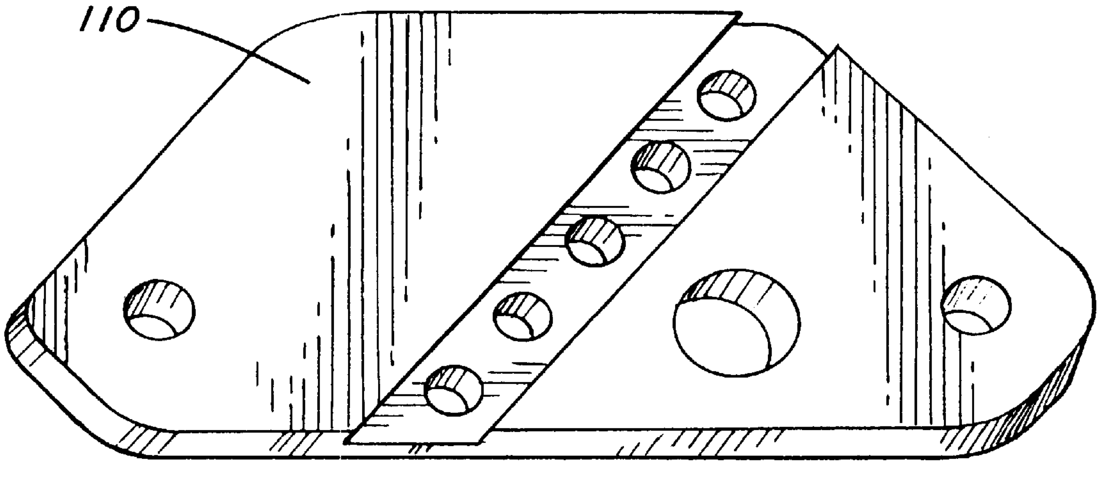
FIG. 9 illustrates an alternative plate for use in a major-wheel-forward embodiment of the present invention.

Thanks to the versatility of the present invention, it is a simple matter for a manufacturing standpoint to reconfigure the wheelchair into a forward wheel design. The respective axle plates and their corresponding axle extension plates are simply moved forward along their respective side frames and bolted to the front rather to the rear of the frame. To move the caster wheels 26 and 24 backwardly an additional caster plate is added to the rear of the frame. FIG. 9 illustrates a caster plate 110 that can be added to the rear of the frame to support the casters 28 and 30. The caster plate 110 is provided with a plurality of apertures for mounting the plate onto the side frame and for mounting the casters to the respective additional caster plates as illustrated in FIG. 9. In this alternative embodiment, it is preferred that the respective side frame portions 40 and 42 be provided with sufficient apertures along the rear portions thereof for mounting the additional caster plate.

Various other modifications may be made. For example, the one piece footrest 32 may just be easily be broken into separate left and right footrests. The respective handles may be made to be foldable or rotatable forward, as desired. The relative sizes of the wheels 12 and 14 may be made larger or smaller as the need arises. The design may be adapted to construct folding wheelchairs, for example, rather than the rigid configuration as shown. Consequently, it is to be understood that the present invention is not limited to the preferred embodiment illustrated herein.

It should be further noted that although the drawings illustrate one embodiment of the invention, these are not engineering production drawings. Consequently, the relative dimensions that the drawings illustrate are not necessarily those that would be used in production.

What is claimed is:

1. A sideframe for a wheelchair comprising:

a top frame having a plurality of mounting apertures;

a separate bottom frame having a plurality of mounting apertures;

an axle plate having a plurality of mounting apertures and an elongated central opening;

said axle plate having an upper end and a lower end, said upper end being removably mounted to said top frame, said lower end being removably mounted to said bottom frame; and an axle extension plate adjustably mounted on said axle plate, said axle extension plate having an opening for a wheel axle, the opening for the wheel axle being positioned adjacent to the elongated central opening of the generally axle plate;

and wherein;

the plurality of mounting apertures of the top frame extend substantially horizontally from a front end of the sideframe to a back end of the sideframe so that the wheel axle can be moved between the front and back end of the sideframe;

the plurality of mounting apertures of the bottom frame extend substantially horizontally from a front end of the sideframe to a back end of the sideframe;

the plurality of mounting apertures of the axle plate extend in multiple substantially vertical columns; and the axle extension plate has multiple substantially vertical columns of mounting apertures corresponding to the plurality of mounting apertures of the axle plate for adjusting the vertical position of the wheel axle relative to the top and bottom frame;

and further comprising:

a first plurality of fasteners extending through at least two of the mounting apertures of the axle plate into the mounting apertures of the top frame to removably attach the top frame to the bottom frame and to adjust the distance between the top frame and the bottom frame; and a second plurality of fasteners extending through at least two of the mounting apertures of the axle plate into the mounting apertures of the bottom frame to removably attach the top frame to the bottom frame and to adjust the distance between the top frame and the bottom frame.

2. The sideframe of claim 1, wherein:

said top frame and said bottom frame are removably attached to one another, said top frame comprises an upper portion and a downwardly extending portion, said downwardly-extending portion being removably attached to said bottom frame, said downwardly extending portion including a concave end piece adapted for engagement with said bottom frame; and wherein said sideframe is free of welds.

3. The sideframe of claim 2, wherein:

the concave end piece engages ½ or less of the outer circumference of a tube forming the bottom frame.

4. The sideframe of claim 1, wherein:

the axle plate is removably connectable at the front end of the sideframe for use in a front-drive wheelchair and is removably connectable at the back end of the wheelchair for a rear-drive wheelchair.

5. The sideframe of claim 1, further comprising:

a caster plate having a central opening through which a caster is mounted and having a plurality of mounting apertures about a perimeter of the caster plate; and a plurality of fasteners extending through at least two of the mounting apertures of the caster plate into the mounting apertures of the top and bottom frames to cooperate with the axle plate in removably attaching the top frame to the bottom frame.

6. A sideframe for a wheelchair as defined in claim 1, wherein said sideframe further comprises an anti-tip member extending rearwardly therefrom.

7. A sideframe for a wheelchair as defined in claim 1, wherein the vertical spacing between the bottom frame and the top frame is approximately six inches or less, as measured from the bottom of the bottom frame to the top of the top frame.

* * * * *